United States Patent
Salter et al.

(10) Patent No.: US 9,796,325 B2
(45) Date of Patent: Oct. 24, 2017

(54) EXTERIOR LIGHT SYSTEM FOR A VEHICLE

(71) Applicant: Ford Global Technologies, LLC, Dearborn, MI (US)

(72) Inventors: Stuart C. Salter, White Lake, MI (US); Pietro Buttolo, Dearborn Heights, MI (US); Paul Kenneth Dellock, Northville, MI (US); Sleiman N. Abdelnour, Macomb, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 276 days.

(21) Appl. No.: 14/837,015

(22) Filed: Aug. 27, 2015

(65) Prior Publication Data
US 2015/0367772 A1 Dec. 24, 2015

Related U.S. Application Data

(63) Continuation-in-part of application No. 14/603,636, filed on Jan. 23, 2015, now Pat. No. 9,573,517, which
(Continued)

(51) Int. Cl.
*B60Q 1/00* (2006.01)
*B60Q 1/26* (2006.01)
(Continued)

(52) U.S. Cl.
CPC ......... *B60Q 1/2603* (2013.01); *B60Q 1/0035* (2013.01); *B60Q 1/26* (2013.01); *B60Q 1/323* (2013.01); *F21S 48/215* (2013.01); *H05B 37/0218* (2013.01); *H05B 37/0227* (2013.01); *Y02B 20/46* (2013.01)

(58) Field of Classification Search
CPC ...... B60Q 1/0029; B60Q 1/0035; B60Q 1/24; B60Q 1/26; B60Q 1/2603; B60Q 1/2615; B60Q 1/2619; B60Q 1/2623–1/2653; B60Q 1/2661; B60Q 1/2669; B60Q 1/28; B60Q 1/30; B60Q 1/302; B60Q 1/32; B60Q 1/323; F21S 48/215; F21S 48/218; H05B 37/0218; H05B 37/0227; Y02B 20/46
USPC ........ 362/487, 493–496, 501, 505–506, 540, 362/543–549
See application file for complete search history.

(56) References Cited

U.S. PATENT DOCUMENTS 2,486,859 A   11/1949   Meijer et al.
5,053,930 A   10/1991   Benavides
(Continued)

FOREIGN PATENT DOCUMENTS

CN   101337492 A   1/2009
CN   201169230 Y   2/2009
(Continued)

*Primary Examiner* — Jason Moon Han
(74) *Attorney, Agent, or Firm* — Jason Rogers; Price Heneveld LLP

(57) ABSTRACT

A vehicle lighting system is provided herein and includes light-producing assemblies, each coupled to a body portion of a vehicle. At least one light-sensing device is included for sensing ambient light levels. A controller is configured to selectively activate each of the light-producing assemblies at a variable intensity as a function of a sensed ambient light level and/or a determined direction of the ambient light.

14 Claims, 7 Drawing Sheets

Related U.S. Application Data is a continuation-in-part of application No. 14/086,442, filed on Nov. 21, 2013.

(51) Int. Cl.
*B60Q 1/32* (2006.01)
*F21S 8/10* (2006.01)
*H05B 37/02* (2006.01)

(56) References Cited

U.S. PATENT DOCUMENTS

| | | |
|---|---|---|
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Thompson et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,928,180 B2 | 8/2005 | Stam et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,438,451 B2 | 10/2008 | Daniel |
| 7,441,914 B2 | 10/2008 | Palmer et al. |
| 7,501,749 B2 | 3/2009 | Takeda et al. |
| 7,541,743 B2 | 6/2009 | Salmeen et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,350,690 B2 | 1/2013 | Biondo et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,842,176 B2 | 9/2014 | Schofield et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0185130 A1 | 7/2012 | Ekchian et al. |
| 2012/0280528 A1 | 11/2012 | Dellock et al. |
| 2013/0092965 A1 | 4/2013 | Kijima et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 102008032345 A1 | 1/2010 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

EXTERIOR LIGHT SYSTEM FOR A VEHICLE

CROSS-REFERENCE TO THE RELATED APPLICATIONS

This application is a continuation-in-part of U.S. patent application Ser. No. 14/603,636, filed Jan. 23, 2015, entitled "DOOR ILLUMINATION AND WARNING SYSTEM," now U.S. Pat. No. 9,573,517, which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to exterior vehicle lighting systems and more particularly relates to exterior vehicle lighting systems employing photoluminescent technology.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, an exterior vehicle lighting system is provided and includes light-producing assemblies, each coupled to a body portion of a vehicle. At least one light-sensing device is included for sensing ambient light levels. A controller is configured to selectively activate each of the light-producing assemblies at a variable intensity as a function of a sensed ambient light level and/or a determined direction of the ambient light.

According to another aspect of the present invention, an exterior vehicle lighting system is provided and includes a light-producing assembly coupled to a body portion of a vehicle. A light-sensing device is configured to sense an ambient light level. A controller is configured to selectively activate the light-producing assembly in response to a sensed ambient light level.

According to yet another aspect of the present invention, an exterior vehicle lighting control method is provided and includes the steps of coupling light-producing assemblies to a body portion of a vehicle, sensing ambient light levels with at least one light-sensing device, and selectively activating each of the light-producing assemblies at a variable intensity as a function of a sensed ambient light level and/or a determined direction of the ambient light.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
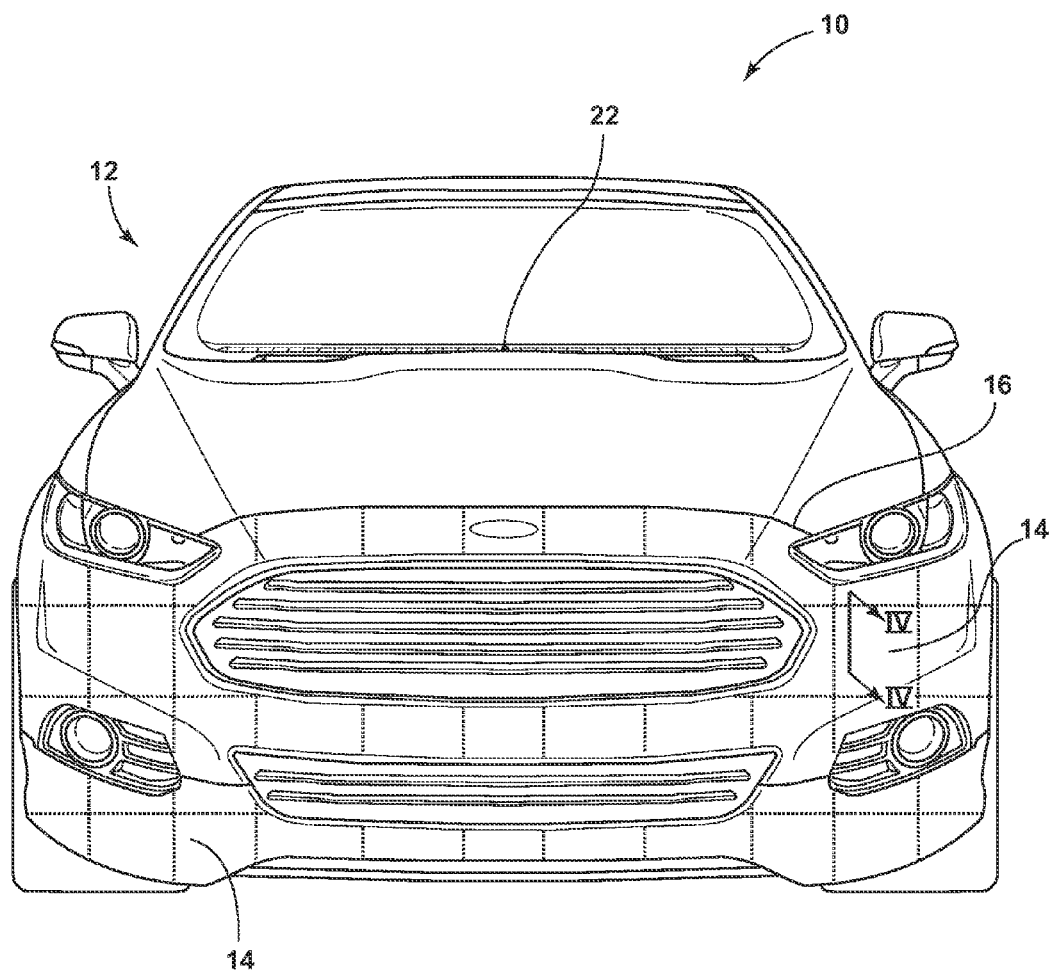
FIG. 1 is a front perspective view of a vehicle equipped with an exterior vehicle lighting system, according to one embodiment.
Figure 2:
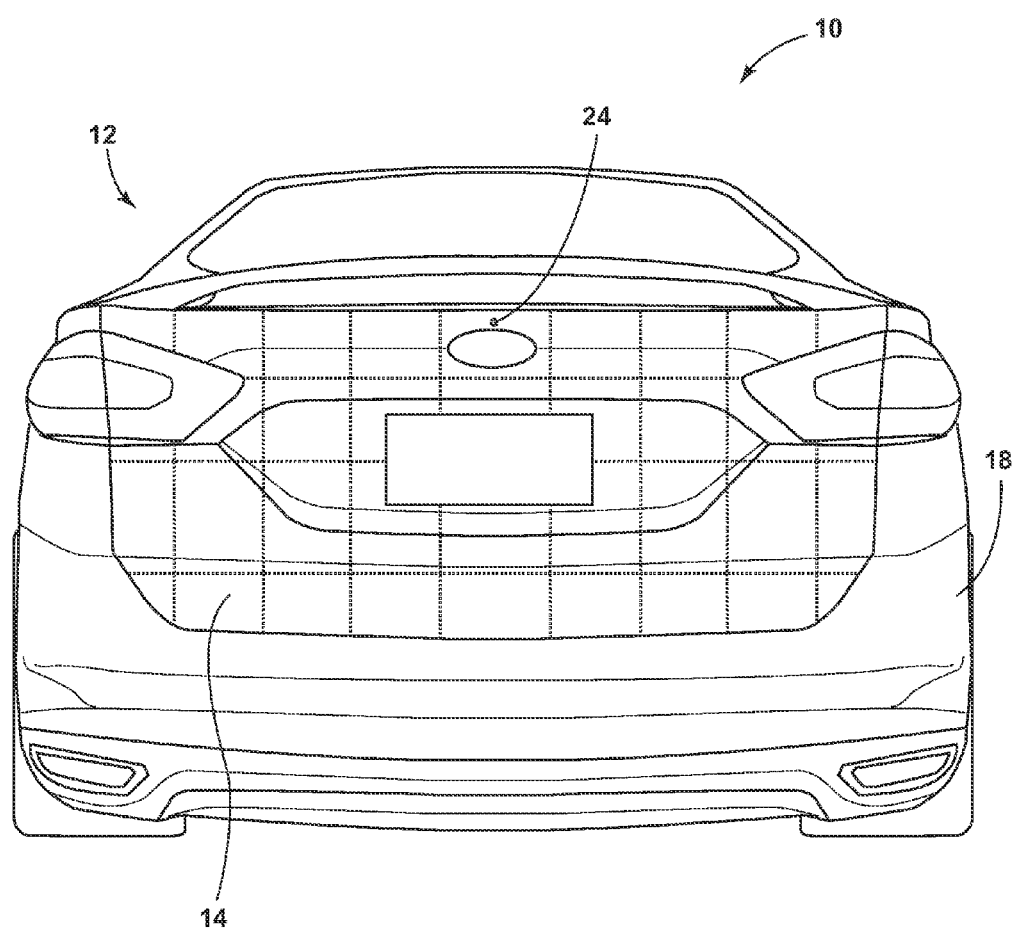
FIG. 2 is a rear perspective view of the vehicle shown in FIG. 1.
Figure 3:
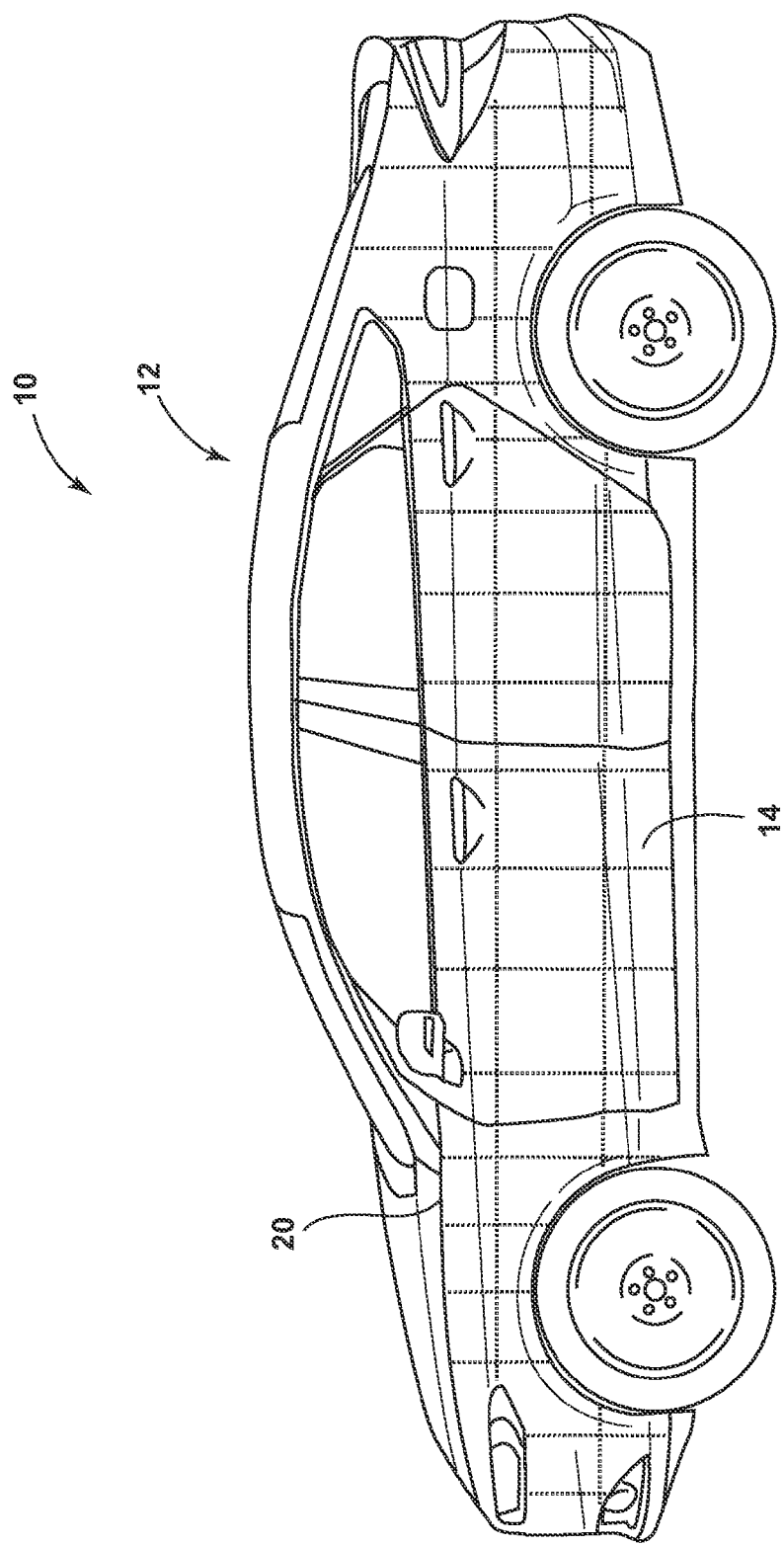
FIG. 3 is a side perspective view of the vehicle shown in FIG. 1.

Referring to FIGS. 1-3, an exterior vehicle lighting system 10 for a vehicle 12 will now be described herein according to one embodiment. The system 10 includes one or more light-producing assemblies 14, each coupled to a body portion of the vehicle 12 including a front body portion 16, a rear body portion 18, and a side body portion 20. For exemplary purposes, the light-producing assemblies 14 are arranged as rectangular strips to form columns and rows covering a substantial area of the front, rear, and side body portions 16, 18, 20. However, it should be appreciated that the light-producing assemblies 14 may be arranged in other shapes and dimensions and may cover a smaller area if desired. Furthermore, it should be appreciated that light-producing assemblies 14 may also be arranged to cover other body portions of the vehicle 12 not shown herein such as the hood, roof, etc. While the light-producing assemblies 14 are described herein as being located on the exterior of the vehicle 12, it is contemplated that light-producing assemblies 14 may be similarly adapted in the interior of the vehicle 12. As will be described in greater detail herein, each light-producing assembly 14 may be configured as a printed LED arrangement. The light-producing assemblies 14 may be thermoformed and coupled to the corresponding body portions via any means known in the art.

Referring still to FIGS. 1-3, the system 10 further includes at least one light-sensing device for sensing ambient light levels. According to one embodiment, the system 10 includes a conventional day/night sensor 22 configured to sense ambient light levels toward the front of the vehicle 12. Additionally, the system 10 includes a camera 24 disposed toward the rear of the vehicle 12 and configured to image a rear vehicle scene. Images taken by the camera 24 may be processed to determine ambient light levels toward the rear of the vehicle 12. As will be described in greater detail herein, each of the light-producing assemblies 14 may be selectively activated at a variable intensity as a function of a sensed ambient light level and/or a determined direction of the ambient light.

Figure 4:
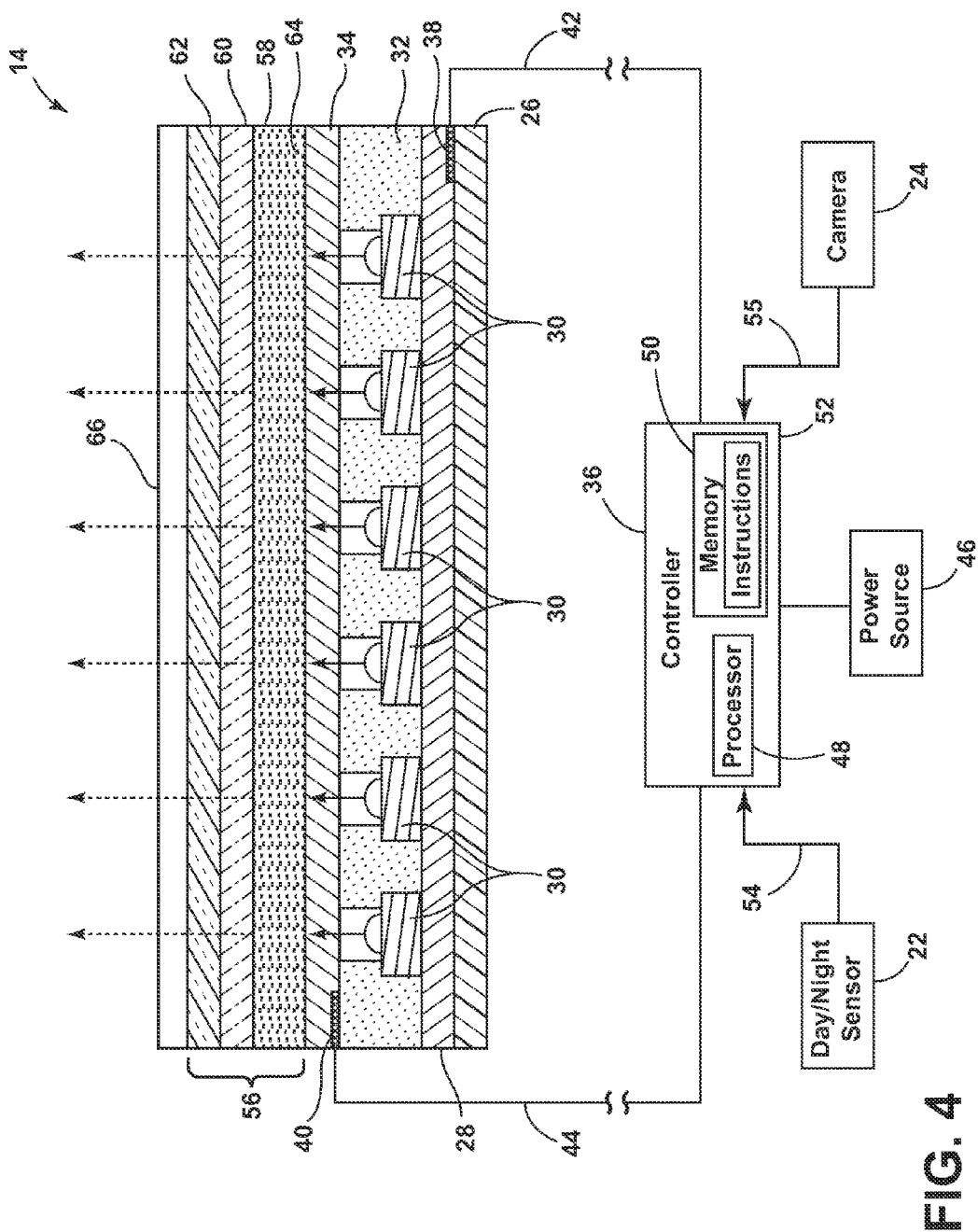
FIG. 4 is a cross-sectional view of a light-producing assembly taken along line IV-IV in FIG. 1, according to one embodiment.

Referring to FIG. 4, a cross-sectional view of a light-producing assembly 14 is shown according to one embodiment. The light-producing assembly 14 includes a substrate 26 such as a polycarbonate, poly-methyl methacrylate (PMMA), or polyethylene terephthalate (PET) material on the order of 0.005 to 0.060 inches thick. A positive electrode 28 is arranged over the substrate 26 and includes a conductive epoxy such as, but not limited to, a silver-containing or copper-containing epoxy. The positive electrode 28 is electrically connected to a plurality of light sources, shown as light emitting diodes (LEDs) 30, which are arranged within a semiconductor ink 32 and applied over the positive electrode 28. A negative electrode 34 is also electrically connected to the LEDs 30 and is arranged over the semiconductor ink 32. The negative electrode 34 includes a transparent or translucent conductive material such as, but not limited to, indium tin oxide. In alternative embodiments, the positive and negative electrodes 28, 34 may swap positions within the light-producing assembly 14, in which case the positive electrode 28 should include a transparent or translucent conductive material to allow light emitted from the LEDs 30 to be transmitted therethrough. The positive and negative electrodes 28, 34 are each electrically connected to a controller 36 via a corresponding bus bar 38, 40 and a corresponding conductive lead 42, 44. The bus bars 38, 40 may be printed along opposite edges of the positive and negative electrodes 28, 34 and the points of connection between the bus bars 38, 40 and the conductive leads 42, 44 may be at opposite corners of each bus bar 38, 40 to promote uniform current distribution along the bus bars 38, 40.

The controller 36 may be variously located in the vehicle 12 and the conductive leads 42, 44 may be wired through the corresponding body portion of the vehicle 12. The controller 36 is communicatively coupled to the day/night sensor 22 and the camera 24. The controller 36 is also electrically connected to a power source 46, which may correspond to a vehicular power source operating at 12 to 16 VDC. It is contemplated that each of the light-producing assemblies 14 shown in FIGS. 1-3 may be similarly connected to the controller 36, thus enabling the controller 36 to independently control an activation state of each light-producing assembly 14. The controller 36 may include a processor 48 and a memory 50 having instructions 52 stored thereon that are executed by the processor 48. The instructions 52 enable the controller 36 to selectively control each of the light-producing assemblies 14 based on one or more input signals (e.g., signals 54 and 55), which may be received from the day/night sensor 22, the camera 24, or other vehicle equipment.

The LEDs 30 may be dispersed in a random or controlled fashion within the semiconductor ink 32. The LEDs 30 may include micro-LEDs of gallium nitride elements on the order of 5 to 400 microns in size and the semiconductor ink 32 may include various binders and dielectric material including, but not limited to, one or more of gallium, indium, silicon carbide, phosphorous, and/or translucent polymeric binders. The semiconductor ink 32 can be applied through various printing processes, including ink jet and silk screen processes to selected portion(s) of the positive electrode 28. More specifically, it is envisioned that the LEDs 30 are dispersed within the semiconductor ink 32, and shaped and sized such that a substantial quantity of them align with the positive electrode 28 and the negative electrode 34 during deposition of the semiconductor ink 32. Additional information regarding printed LED arrangements is disclosed in U.S. Patent Publication No. 2014-0264396 A1 to Lowenthal et al., entitled "ULTRA-THIN PRINTED LED LAYER REMOVED FROM SUBSTRATE," now U.S. Pat. No. 9,299,887, filed Mar. 12, 2014, the entire disclosure of which is incorporated herein by reference.

Referring still to FIG. 4, a photoluminescent structure 56 is arranged over the negative electrode 34. The photoluminescent structure 56 may be arranged as a coating, layer, film or other suitable deposition. With respect to the presently illustrated embodiment, the photoluminescent structure 56 may be arranged as a multi-layered structure including an energy conversion layer 58, an optional stability layer 60, and an optional protection layer 62. The energy conversion layer 58 includes at least one photoluminescent material 64 having energy converting elements with phosphorescent or fluorescent properties. For example, the photoluminescent material 64 may include organic or inorganic fluorescent dyes including rylenes, xanthenes, porphyrins, phthalocyanines. Additionally or alternatively, the photoluminescent material 64 may include phosphors from the group of Ce-doped garnets such as YAG:Ce. The energy conversion layer 58 may be prepared by dispersing the photoluminescent material 64 in a polymer matrix to form a homogenous mixture using a variety of methods. Such methods may include preparing the energy conversion layer 58 from a formulation in a liquid carrier medium and coating the energy conversion layer 58 to the negative electrode 34. The energy conversion layer 58 may be applied to the negative electrode 34 by painting, screen printing, flexography, spraying, slot coating, dip coating, roller coating, and bar coating. Alternatively, the energy conversion layer 58 may be prepared by methods that do not use a liquid carrier medium. For example, the energy conversion layer 58 may be rendered by dispersing the photoluminescent material 64 into a solid state solution (homogenous mixture in a dry state) that may be incorporated in a polymer matrix formed by extrusion, injection, compression, calendaring, thermoforming, etc.

To protect the photoluminescent material 64 contained within the energy conversion layer 58 from photolytic and thermal degradation, the photoluminescent structure 56 may optionally include a stability layer 60, which may be configured as a separate layer optically coupled and adhered to the energy conversion layer 58 or otherwise integrated therewith. Each photoluminescent structure 56 may also optionally include a protection player 62 optically coupled and adhered to the stability layer 60 or other layer to protect the photoluminescent structure 56 from physical and chemical damage arising from environmental exposure. The stability layer 60 and/or the protection layer 62 may be combined with the corresponding energy conversion layer 58 through sequential coating or printing of each layer, sequential lamination or embossing, or any other suitable means. In one embodiment, a concealing element 66 may be arranged over the photoluminescent structure 56 to conceal the light-producing assembly 14 such that the light-producing assembly 14 goes unnoticed unless it is in an activated state (e.g., outputting photoluminesecent light). For example, the concealing element 66 may be a deadfronted or metallized layer that blends in with its background. In this manner, a multitude of light-producing assemblies 14 may be arranged to discreetly cover large areas of the vehicle 12 without affecting the aesthetics of the vehicle 12.

In operation, the photoluminescent structure 56 is configured to luminesce in response to excitation by light emitted by the LEDs 30. More specifically, light emitted from the LEDs 30 undergoes an energy conversion process and is converted by the photoluminescent material 64 and re-emitted therefrom at a different wavelength. Light emitted by the LEDs 30 is referred to herein as inputted light and is demonstrated in FIG. 4 by solid arrows, whereas light re-emitted from the photoluminescent material 64 is referred to herein as converted light or luminescent light and is demonstrated in FIG. 4 by broken arrows. According to one embodiment, the photoluminescent material 64 may be formulated to convert inputted light into a longer wavelength light, otherwise known as down conversion. Alternatively, the photoluminescent material 64 may be formulated to convert inputted light into a shorter wavelength light, otherwise known as up conversion. Under either approach, light converted by the photoluminescent material 64 may be subsequently outputted from the corresponding photoluminescent structure 56 or otherwise used in an energy cascade, wherein the converted light serves as inputted light to excite another formulation of photoluminescent material located within the energy conversion layer 58, whereby the subsequent converted light may then be outputted from the photoluminescent structure 56 or used as inputted light, and so on. With respect to the energy conversion processes described herein, the difference in wavelength between the inputted light and the converted light is known as the Stokes shift and serves as the principle driving mechanism for an energy conversion process corresponding to a change in wavelength of light.

According to one embodiment, the photoluminescent material 64 is formulated to have a Stokes shift resulting in the converted light having an emission spectrum expressed in a desired color. In one embodiment, the energy conversion process may be undertaken by way of down conversion, whereby the inputted light includes light on the lower end of the visibility spectrum such as blue, violet, or ultraviolet (UV) light. Doing so enables blue, violet, or UV LEDs to be used as the LEDs 30, which may offer a relative cost advantage over other colors of LEDs or simply using LEDs of the desired color and omitting the photoluminescent structure 56 altogether.

In alternative embodiments, the energy conversion layer 58 may include more than one distinct photoluminescent material, each of which is configured to convert inputted light into a longer or shorter wavelength light. In one embodiment, the distinct photoluminescent materials may be interspersed within the energy conversion layer 58. Alternatively, the distinct photoluminescent materials may be isolated from each other if desired. For example, the distinct photoluminescent materials may be arranged to alternate in a tessellation or other pattern. In either embodiment, each distinct photoluminescent material may be uniquely excited by a corresponding portion of the LEDs 30, which may be variously arranged. In some embodiments, each distinct photoluminescent material may be formulated to have a Stokes shift resulting in the associated converted light having an emission spectrum expressed in a unique color such that the resultant luminescence corresponds to a light mixture of the converted light from each distinct photoluminescent material. By mixing the converted light outputted from two or more distinct photoluminescent materials, a greater diversity of colors may be expressed that might otherwise be unachievable through the excitation of a single photoluminescent material. Contemplated colors include light mixtures containing any combination of red, green, and blue light, all of which may be achieved by selecting the appropriate combinations of photoluminescent materials and LEDs. Additional information on the arrangements of distinct photoluminescent materials and corresponding LEDs is disclosed in U.S. patent application Ser. No. 14/697,035 to Salter et al., entitled "LIGHT-PRODUCING ASSEMBLY FOR A VEHICLE," filed Apr. 27, 2015," the entire disclosure of which are incorporated herein by reference. Additional information regarding photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," issued Jul. 31, 2012, the entire disclosure of which is incorporated herein by reference.

Figure 5:
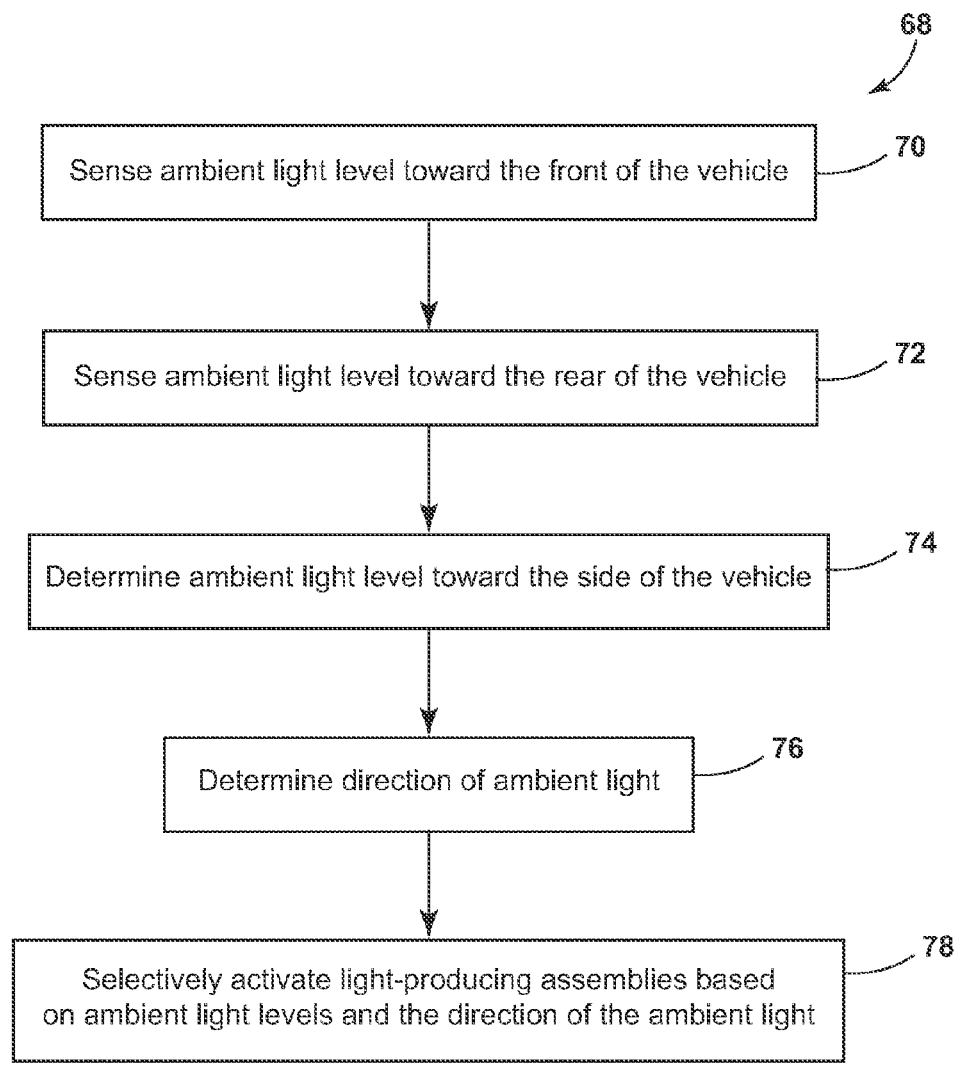
FIG. 5 is a flow diagram of a method for controller exterior vehicle lighting, according to one embodiment.

Referring to FIG. 5, flow diagram of an exterior light control method 68 is shown according to one embodiment. The method 68 may be implemented by the controller 36 of the system 10 and will be exemplarily described with further reference to the vehicle 12 shown in FIGS. 1-4, in which light-producing assemblies 14 are coupled to the front, rear, and side body portions 16, 18, 20 of the vehicle 12. At step 70, the controller 36 prompts the day/night sensor 22 or other suitable sensor to sense an ambient light level at the front 16 of the vehicle 12. At step 72, the controller 36 prompts the camera 24 or other suitable sensor to sense an ambient level toward the rear 18 of the vehicle 12. While steps 70 and 72 are shown and described in a linear manner, it should be appreciated that they may be performed concurrently or in a different order. At step 74, the controller 36 determines an ambient light level toward the side 20 of the vehicle 12. According to one embodiment, the controller 36 determines the ambient light level toward the side 20 of the vehicle 12 by interpolating the sensed ambient light levels toward the front 16 and rear 18 of the vehicle 12. Alternatively, the ambient light level toward the side 20 of the vehicle 12 may be detected using a dedicated light sensor. At step 76, the controller 36 determines a direction of the ambient light with respect to the vehicle 12 based on the ambient light levels at the front, rear, and side 16, 18, 20 of the vehicle 12. At step 78, the controller 36 selectively activates the light-producing assemblies 14 at variable intensities based on the ambient light levels determined in steps 70-74 and the direction of the ambient light determined at step 76. As defined herein, ambient light includes natural light (e.g., sunlight) as well as light directed toward the vehicle 12 from external light sources such as light from another vehicle, street lighting, and the like. Thus, by adjusting the output of the light-producing assemblies 14 in response to the manner in which ambient light strikes on the vehicle 12, the light-producing assemblies 14 can be operated such that their perceived brightness is equalized. That is, light-producing assemblies 14 located on body portions that are flooded with ambient light may be made to illuminate at a higher intensity whereas light-producing assemblies 14 located elsewhere may be made to illuminate at a lower intensity. As a result, when the vehicle 12 is viewed from the front, rear, or side 16, 18, 20, the illumination produced by the light-producing assemblies 14 appears evenly distributed, thus giving the vehicle 12 a more refined appearance.

Figure 6:
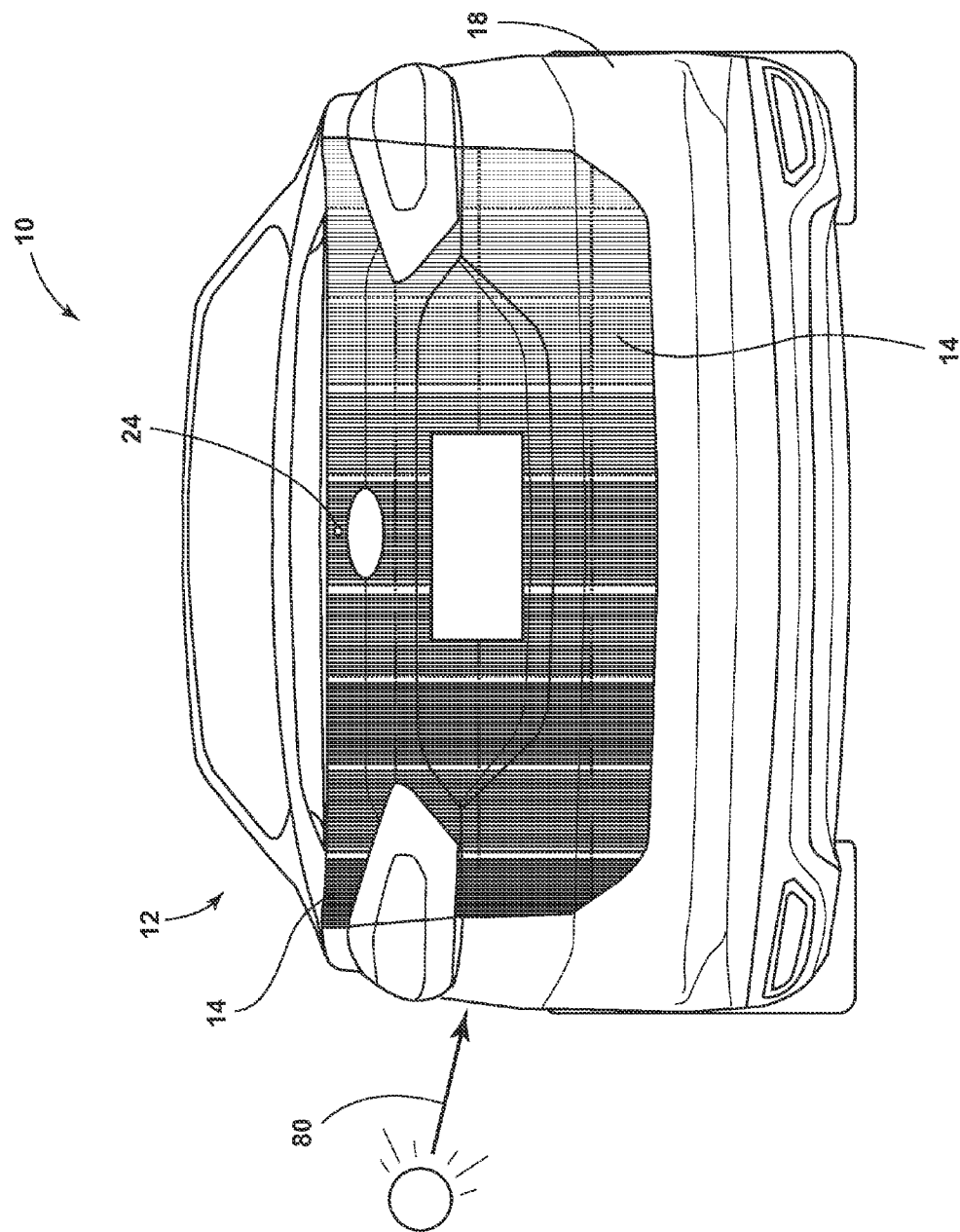
FIGS. 6 and 7 show an exterior lighting scheme for a vehicle equipped with the exterior vehicle lighting system.
Figure 7:
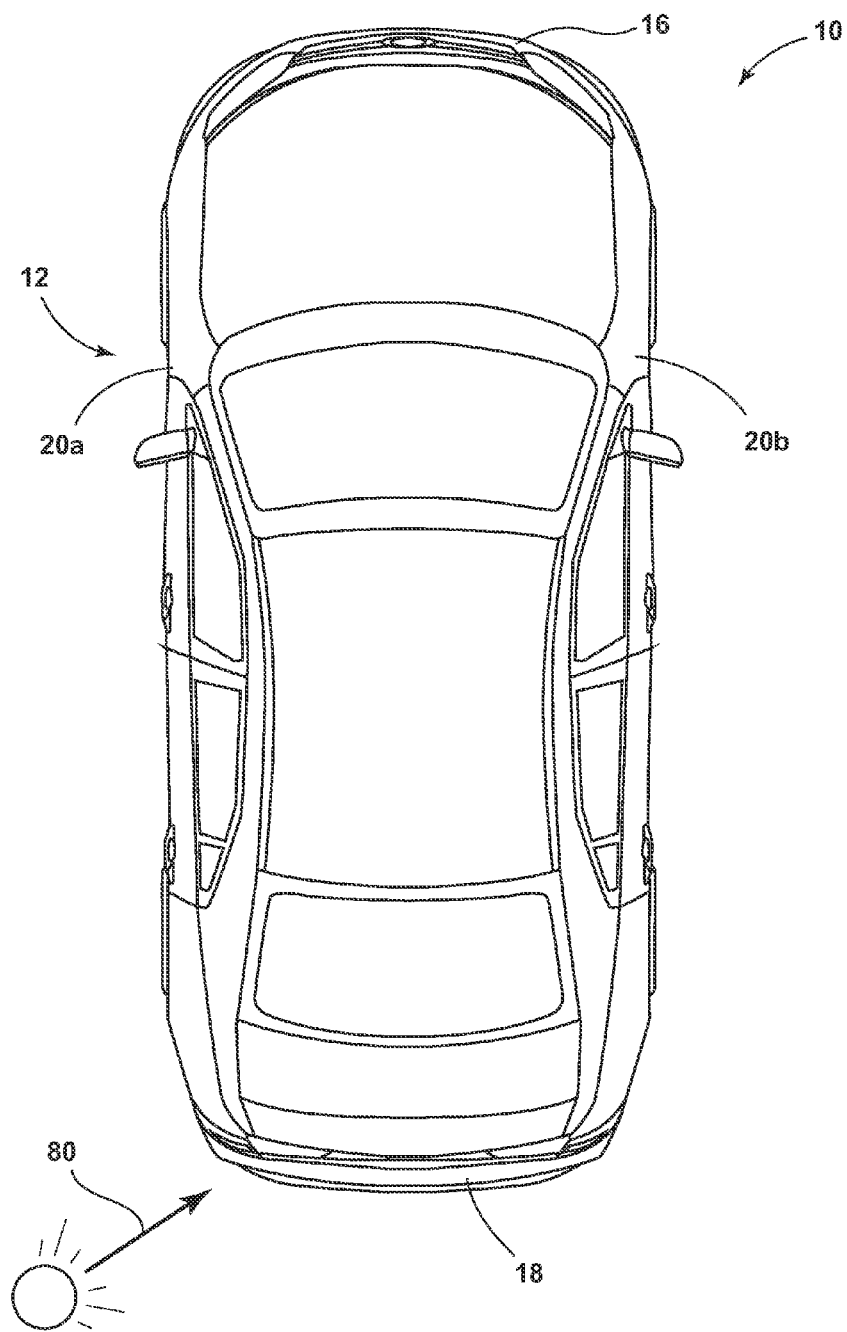

Referring to FIGS. 6-7, an exemplary exterior lighting scheme is shown according to one embodiment. As shown, light-producing assemblies 14 are coupled to a rear body portion 18 of the vehicle 12 and arranged in rows and columns. In this example, sunlight strikes the rear body portion 18 at an angle in the direction specified by arrow 80. The example may correspond to a typical twilight situation in which only a portion of the vehicle 12 makes direct contact with sunlight. In such an instance, if the light-producing assemblies 14 were operated to output light at the same intensity, the perceived brightness of the light-producing assemblies 14 located toward the left side of the rear body portion 18 would likely be lower than that of the light-producing assemblies 14 located toward the right side of the rear body portion 18 when the rear body portion 18 is viewed head on. To compensate for this, the controller 36 may determine the ambient light level and direction with respect to the rear body portion 18 of the vehicle 12 and subsequently activate the light-producing assemblies 14 at variable intensities such that the perceived brightness is evenly distributed across the rear body portion 18 when it is viewed from head on. For instance, the light-producing assemblies 14 may be operated to exhibit a gradient intensity across the rear body portion 18, as demonstrated by the shading shown in FIG. 6, wherein darker shading corresponds to light being outputted at a higher intensity to increase its visibility amidst higher ambient light levels. If available, the controller 36 may also activate light-producing assemblies 14 located on the front 16 and sides 20 of the vehicle 12 in response to the detected ambient light level and direction. With respect to the instant example, light-producing assemblies 14 located on the front 16 and right side 20*b* of the vehicle 12 (e.g., when viewed from the rear) may be activated at a lower intensity due to them being shielded from direct sunlight whereas light-producing assemblies 14 located on the left side 20*a* of the vehicle 12 may be activated at variable intensity to compensate for portions of the left side being directly exposed to varying levels of ambient light.

Accordingly, an exterior vehicle lighting system 10 has been advantageously described herein. It should be appreciated that the system 10 described herein may be adapted for a variety of functions. For example, it is contemplated that light-producing assemblies 14 may be configured to provide functional or decorative lighting. For instance, the light-producing assemblies 14 may be operated to supplement existing exterior vehicle lighting such as headlamps and taillights. In another instance, the light-producing assemblies 14 may be operated as warning lights for when the vehicle 12 is engaged in a backup maneuver or other maneuver. In still another instance, the light-producing assemblies 14 may be operated as auxiliary running lamps. In yet another instance, some of the light-producing assemblies 14 may be operated as turn signals or as other indicators. These are but a few potential use scenarios for the system 10 and those having ordinary skill in the art will recognize the existence of other lighting applications that may benefit from the system 10 described herein.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An exterior vehicle lighting system comprising:
   light-producing assemblies, each coupled to at least one of a front, side, and rear body panel portion of a vehicle;
   at least one light-sensing device for sensing ambient light levels; and
   a controller configured to interpolate sensed ambient light levels toward a front and rear of the vehicle to determine ambient light levels toward a side of the vehicle and selectively activate each of the light-producing assemblies at a variable intensity as a function of sensed ambient light levels and/or a determined direction of ambient light.

2. The exterior vehicle lighting system of claim 1, wherein the at least one light-sensing device comprises a day/night sensor for sensing ambient light levels toward the front of the vehicle.

3. The exterior vehicle lighting system of claim 2, wherein the at least one light-sensing device further comprises a camera configured to sense ambient light levels toward the rear of the vehicle.

4. The exterior vehicle lighting system of claim 1, wherein light-producing assemblies located on the same body panel portion are arranged thereacross and the controller activates at least a portion of the light-producing assemblies located on the same body panel portion at different intensities to equalize a perceived brightness of the light-producing assemblies located on the same body panel portion in response to ambient light being unevenly directed toward the body panel portion.

5. The exterior vehicle lighting system of claim 1, wherein the light-producing assemblies each comprise printed LEDs and a photoluminescent structure arranged over the printed LEDs and configured to luminesce in response to excitation by light emitted from the printed LEDs.

6. An exterior vehicle lighting system comprising:
   a light-producing assembly coupled to at least one of a front, side, and rear body panel portion of a vehicle;
   a light-sensing device for sensing ambient light levels; and
   a controller for interpolating sensed ambient light levels toward a front and rear of the vehicle to determine ambient light levels toward a side of the vehicle and selectively activating the light-producing assembly in response to sensed ambient light levels.

7. The exterior vehicle lighting system of claim 6, wherein the light-sensing device comprises a day/night sensor for sensing ambient light levels toward the front of the vehicle.

8. The exterior vehicle lighting system of claim 7, wherein the light-sensing device further comprises a camera configured to sense ambient light levels toward the rear of the vehicle.

9. The exterior vehicle lighting system of claim 6, wherein the light-producing assembly comprises printed LEDs and a photoluminescent structure arranged over the printed LEDs, wherein the photoluminescent structure is configured to luminesce in response to excitation by light emitted from the printed LEDs.

10. An exterior vehicle lighting method, comprising the steps of:
    coupling light-producing assemblies to at least one of a front, side, and rear body panel portion of a vehicle;
    sensing ambient light levels with at least one light-sensing device;

interpolating sensed ambient light levels toward a front and rear of the vehicle to determine ambient light levels toward a side of the vehicle; and selectively activating each of the light-producing assemblies at a variable intensity as a function of sensed ambient light levels and/or a determined direction of ambient light.

11. The exterior vehicle lighting method of claim 10, wherein the at least one light-sensing device comprises a day/night sensor for sensing ambient light levels toward to the front of the vehicle.

12. The exterior vehicle lighting method of claim 11, wherein the at least one light-sensing device further comprises a camera configured to sense ambient light levels toward the rear of the vehicle.

13. The exterior vehicle lighting system of claim 10, wherein light-producing assemblies located on the same body panel portion are arranged thereacross and the controller activates at least a portion of the light-producing assemblies located on the same body panel portion at different intensities to equalize a perceived brightness of the light-producing assemblies located on the same body panel portion in response to ambient light being unevenly directed toward the body panel portion.

14. The exterior vehicle lighting system of claim 10, wherein the light-producing assemblies each comprise printed LEDs and a photoluminescent structure arranged over the printed LEDs and configured to luminesce in response to excitation by light emitted from the printed LEDs.

* * * * *